United States Patent
Chen

(10) Patent No.: US 9,854,917 B2
(45) Date of Patent: Jan. 2, 2018

(54) FOLDABLE BED

(71) Applicant: Xusheng Chen, Xiamen (CN)

(72) Inventor: Xusheng Chen, Xiamen (CN)

( * ) Notice: Subject to any disclaimer, the term of this patent is extended or adjusted under 35 U.S.C. 154(b) by 0 days.

(21) Appl. No.: 15/315,727

(22) PCT Filed: Dec. 10, 2014

(86) PCT No.: PCT/CN2014/093446
§ 371 (c)(1),
(2) Date: Dec. 2, 2016

(87) PCT Pub. No.: WO2015/184758
PCT Pub. Date: Dec. 10, 2015

(65) Prior Publication Data
US 2017/0086595 A1    Mar. 30, 2017

(30) Foreign Application Priority Data

Jun. 6, 2014 (CN) .................... 2014 2 0298506 U
Jun. 6, 2014 (CN) .................... 2014 2 0298513 U

(51) Int. Cl.
*A47C 19/00* (2006.01)
*A47C 19/02* (2006.01)
*F16B 12/56* (2006.01)

(52) U.S. Cl.
CPC .......... *A47C 19/005* (2013.01); *A47C 19/022* (2013.01); *A47C 19/025* (2013.01); *F16B 12/56* (2013.01)

(58) Field of Classification Search
CPC ... A47C 19/005; A47C 19/022; A47C 19/025; A47C 19/12
USPC ............................................................. 5/53.1
See application file for complete search history.

(56) References Cited

U.S. PATENT DOCUMENTS

| | | | | |
|---|---|---|---|---|
| 2,660,228 A | * | 11/1953 | Reinhold | A47C 4/02 206/326 |
| 2,933,737 A | * | 4/1960 | Schiffmann | A47C 19/22 5/308 |
| 3,046,572 A | * | 7/1962 | Eames | A47C 17/40 5/136 |
| 3,419,921 A | * | 1/1969 | Flood | A47C 19/22 5/308 |
| 6,986,176 B1 | * | 1/2006 | Lin | A47C 19/22 5/503.1 |
| 7,181,784 B1 | * | 2/2007 | Geilear | A47C 19/22 5/2.1 |
| 7,937,787 B2 | * | 5/2011 | Whitford | A47C 17/46 5/133 |

(Continued)

*Primary Examiner* — Eric J Kurilla
(74) *Attorney, Agent, or Firm* — Leong C. Lei

(57) ABSTRACT

The present invention discloses a foldable bed. A first side rail and a second side rail have an end detachably connected to a headboard and an opposite end detachably connected to a footboard. A bed slat support is arranged between the first side rail and the second side rail. The headboard includes a receiving compartment formed therein. The first side rail and the second side rail each include at least two side rail units and the side rail units are connected to each other by a couple. In dismantling, the side rail units, the footboard, the bed slats, and the bed slat support are receivable and positioned in the receiving compartment. The present invention saves transportation space, reduces transportation cost, and provides a better way of weight carrying.

5 Claims, 5 Drawing Sheets

(56) References Cited

U.S. PATENT DOCUMENTS

| | | | | |
|---|---|---|---|---|
| 8,850,638 B1* | 10/2014 | Suh | ................ | A47C 19/12 |
| | | | | 5/176.1 |
| 8,931,123 B1* | 1/2015 | Oh | ................ | A47C 19/005 |
| | | | | 5/132 |
| 2006/0107456 A1* | 5/2006 | Joseph | ................ | A47C 17/58 |
| | | | | 5/2.1 |
| 2009/0212669 A1* | 8/2009 | Robert-Reitman | .... | A47B 23/00 |
| | | | | 312/204 |
| 2009/0283019 A1* | 11/2009 | Chen | ................ | A47B 3/00 |
| | | | | 108/115 |
| 2011/0197795 A1* | 8/2011 | Baugh | ................ | A47C 19/022 |
| | | | | 108/50.11 |
| 2012/0168328 A1* | 7/2012 | Chen | ................ | A47C 19/005 |
| | | | | 206/223 |
| 2014/0143953 A1* | 5/2014 | Blair | ................ | A47C 4/022 |
| | | | | 5/285 |
| 2017/0071355 A1* | 3/2017 | Oh | ................ | A47C 19/005 |

* cited by examiner

FOLDABLE BED

TECHNICAL FIELD OF THE INVENTION

The present invention relates generally to a foldable bed, and more particularly to a foldable bed comprising a headboard that is capable of receiving and accommodating side rails, a footboard, bed slats, and a bed slat support therein.

DESCRIPTION OF THE PRIOR ART

A bed is generally composed of a headboard, two side rails, a footboard, bed slats, and a bed slat support. One of the side rails has an end mounted to one side of the headboard and an opposite end mounted to one side of the footboard; and another one of the side rails has an end mounted to an opposite side of the headboard and an opposite end mounted to an opposite side of the footboard. The two side rails are generally arranged parallel to each other and the bed slat support is arranged between the two side rails. The bed slat support receives the bed slats positioned thereon.

To transport the bed, the headboard, the side rails, the footboard, the bed slats, and the bed slat support are dismantled sequentially and are disposed in a cargo container. This occupies an excessive amount of transportation space so that each unit cargo container can transport a relatively small number of beds and the transportation cost is raised. The transportation cost is excessively high particularly for export enterprises.

Further, the side rails are each a unitary structure and such a unitary structure of the side rail is a large weight to be carried. Thus, the side rails are generally heavy and bulky, making transportation inconvenient, and moving is difficult when in use, often causing security issues during moving.

SUMMARY OF THE INVENTION

An object of the present invention is to provides a foldable bed, which saves transportation space, reduces transportation cost, and provide a better way of weight carrying.

To achieve the above object, a technical solution adopted in the present invention is as follows:

A foldable bed comprises a headboard, a first side rail, a second side rail, a footboard, and the bed slat support. The first side rail and the second side rail each have an end detachably connected to the headboard and an opposite end detachably connected to the footboard to form a frame. The bed slat support is arranged between the first side rail and the second side rail to support bed slats. The headboard forms a receiving compartment therein. Each side rail of the first side rail and the second side rail comprises at least two side rail units, which are coupled to each other by a coupler such that in dismantling, the side rail units, the footboard, the bed slats, and the bed slat support are receivable and positioned in the receiving compartment.

Further, the headboard comprises a headboard body and a cover plate pivotally connected to the headboard body. The headboard body comprises the receiving compartment formed therein. Closing the cover plate holds the side rail units, the footboard, the bed slats, and the bed slat support in the receiving compartment. The cover plate is fixed in position by a retention member.

Further, the retention member comprises an engagement fitting, a sliding lock, or a Velcro device.

Further, the coupler comprises a support stand mounted thereto such that in a condition of use, the support stand is in contact with a ground surface.

Further, the coupler comprises an upper connection bar and a lower connection bar. The upper connection bar and the lower connection bar are substantially parallel and re fastened by screws to connect the side rail units to form the side rails. The lower connection bar comprises a support stand mounted thereto.

Further, the coupler comprises an I-shaped structure, which comprises an upper connection bar, a lower connection bar, and an intermediate connection bar. The upper connection bar and the lower connection bar are substantially parallel. The intermediate connection bar has an end connected to the upper connection bar and an opposite end connected to the lower connection bar. The upper connection bar and the lower connection bar are fastened by screws to connect the side rail units to form the side rails. The lower connection bar comprises a support stand mounted thereto.

Further, the bed slat support comprises a first support member mounted to the first side rail, a central support member having two ends respectively connected to the headboard and the footboard in a detachable manner, and a second support member mounted to the second side rail.

By adopting the above solution, the present invention provides a headboard that forms therein a receiving compartment and each side rail of a first side rail and a second side rail is composed of at least two side rail units and the side rail units are connected to each other by a coupler. In dismantling, the side rail units, a footboard, bed slats, and the bed slat support are receivable and positioned in the receiving compartment so that in transportation, the coupler is removed to have the first side rail and the second side rail each separated into individual side rail units, and the side rail units, the footboard, the bed slats, and the bed slat support can be positioned in the receiving compartment, whereby the entire bed shows a small size in transportation and a relatively large number of beds can be accommodated in a unit cargo container so as to save transportation space and reduce transportation cost.

Further, the side rail units, the footboard, the bed slats, and the bed slat support that can be positioned in the receiving compartment as a unit for transportation can be treated as single order shipping for network shopping so that there is no need for multiple order shipping and thus saving logistic cost.

DETAILED DESCRIPTION OF THE PREFERRED EMBODIMENTS

Figure 1:
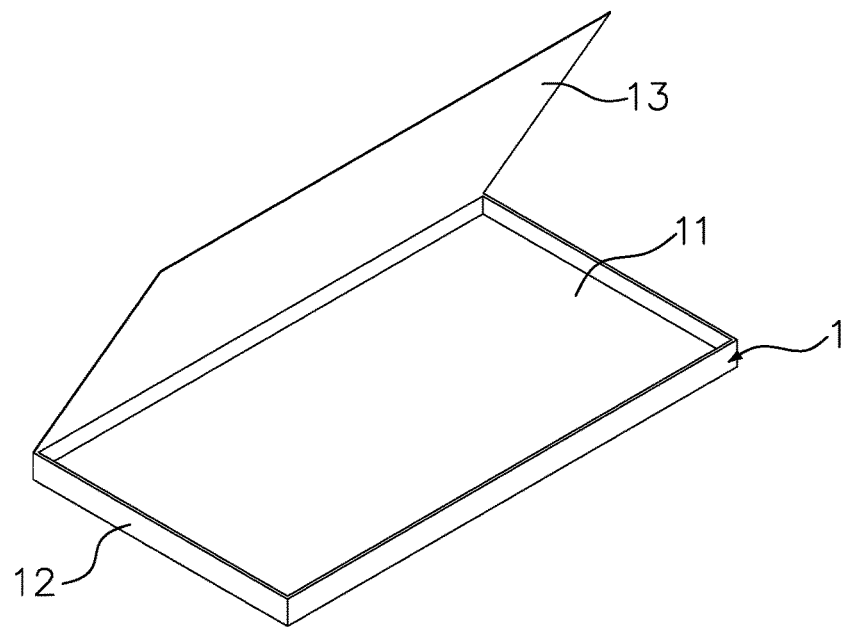
FIG. 1 is a schematic perspective view showing a headboard according to the present invention.

A detailed description will be provided in respect of an embodiment the present invention, with reference being had to the attached drawings.

Referring to FIGS. 1-6, the present invention discloses a foldable bed, which comprises a headboard 1, a first side rail 21, a second side rail 22, a footboard 3, and a bed slat support 4.

Figure 4:
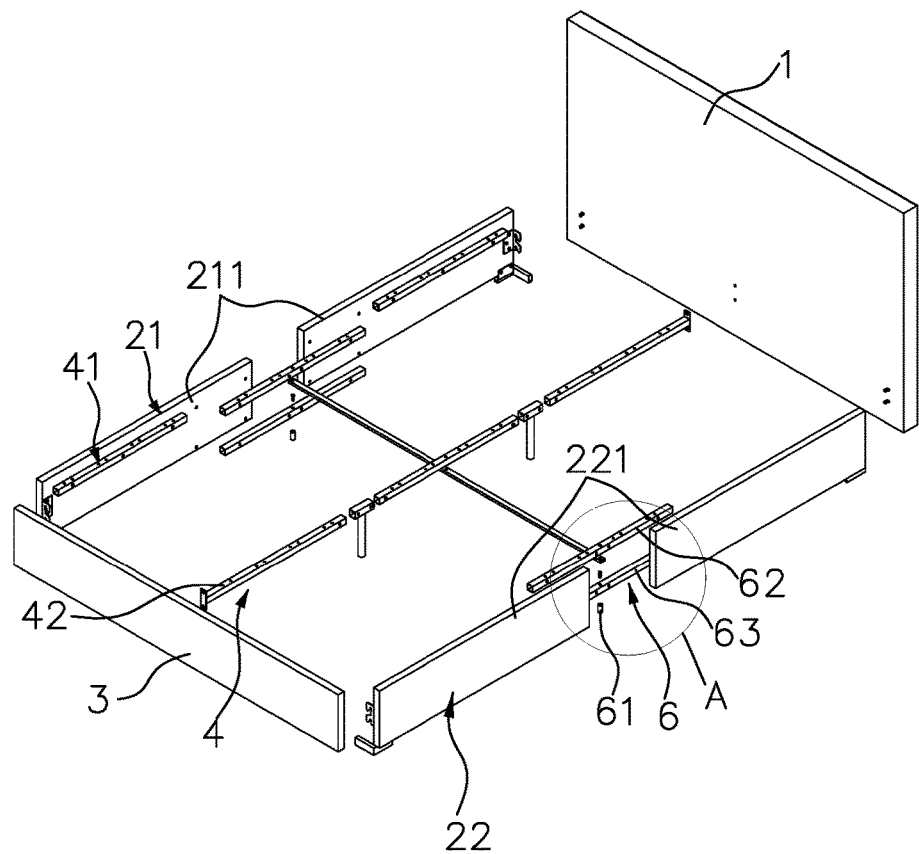
FIG. 4 is an exploded view of the present invention.
Figure 5:
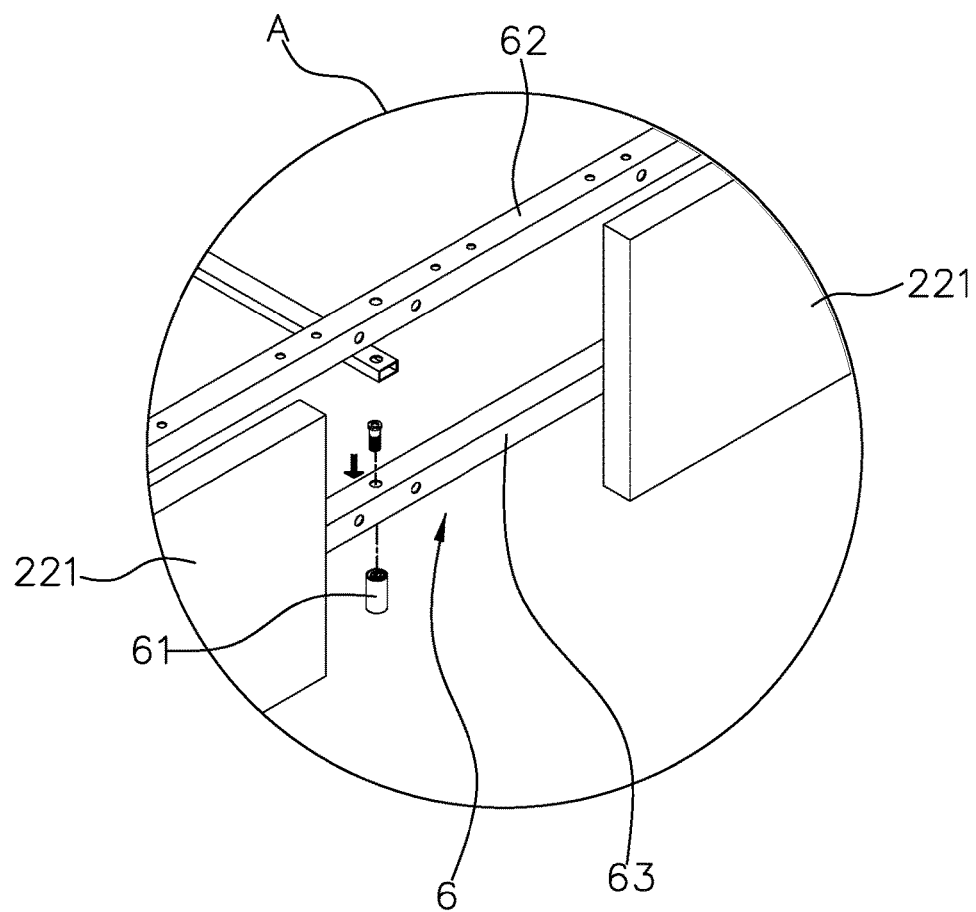
FIG. 5 is an enlarged view of a portion of FIG. 4.
Figure 6:
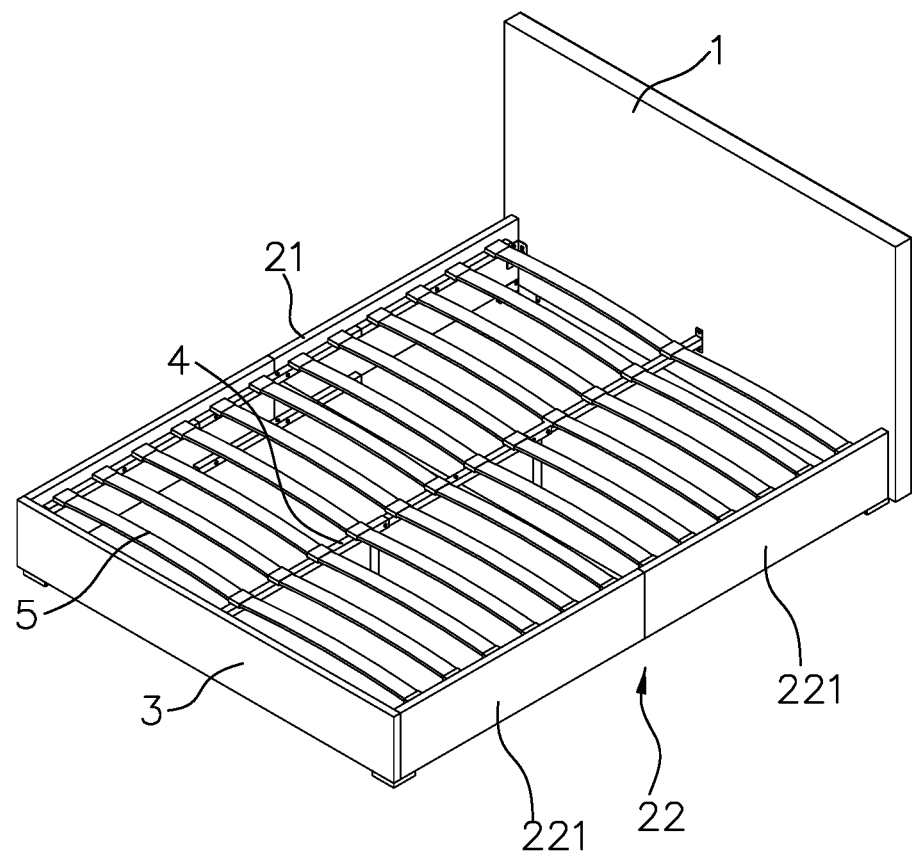
FIG. 6 is a schematic view illustrating the present invention in an assembled form.

As shown in FIG. 4, the first side rail 21 and the second side rail 22 each have an end detachably mounted to the headboard 1 and an opposite end detachably mounted to the footboard to form a frame of the bed. An engagement and coupling fitting structure is generally used to achieve the detachability. The engagement and coupling fitting structure is known and further description will be omitted herein. The bed slat support 4 is arranged between the first side rail 21 and the second side rail 22 to support bed slats 5, as shown in FIG. 6.

Figure 2:
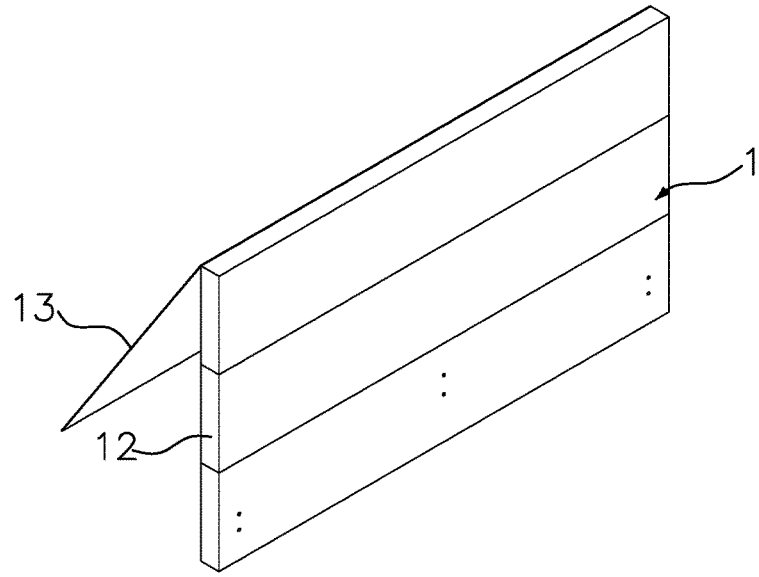
FIG. 2 is a schematic perspective view, taken from a different angle, showing the headboard according to the present invention.
Figure 3:
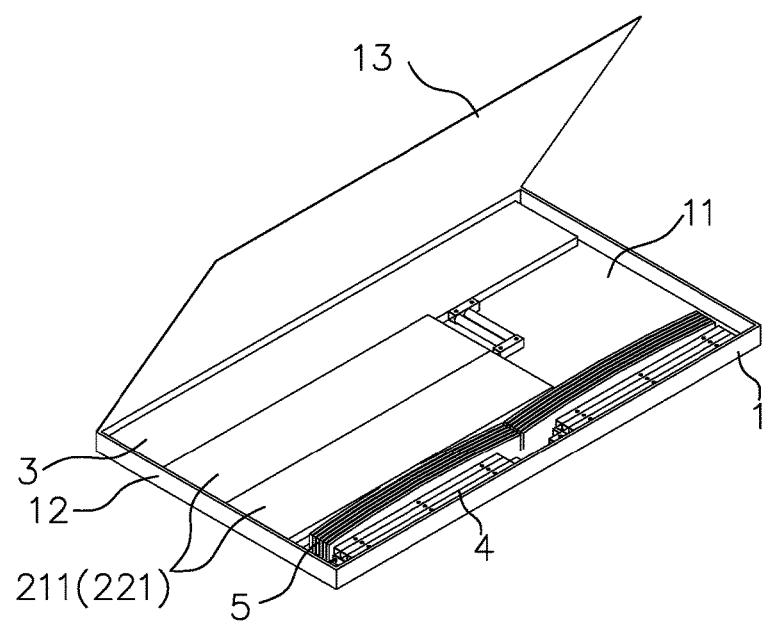
FIG. 3 is a schematic view illustrating side rail units, a footboard, bed slats, and a bed slat support received in a receiving compartment according to the present invention.

As shown in FIGS. 1 and 2, the headboard 1 forms a receiving compartment 11 therein. Each side rail of the first side rail 21 and the second side rail 22 is composed of at least two side rail units (211, 221). As shown in FIG. 4, the side rail units (211, 221) are coupled to each other by a coupler 6. In dismantling, the side rail units (211, 221), the footboard 3, the bed slats 5, and the bed slat support 4 are receivable and disposed in the receiving compartment 11.

In transportation, by removing the couplers 6, the first side rail 21 and the second side rail 22 can be each separated into side rail units (211, 221), and also, the side rail units (211, 221), the footboard 3, the bed slats 5, and the bed slat support 4 can be positioned and received in the receiving compartment 11 so that the entirety of the bed shows a reduced size in transportation and a larger number of beds can be accommodated in a cargo container thereby saving transportation space and thus reducing transportation cost.

In the instant embodiment, as shown in FIGS. 1 and 2, the headboard 1 is composed of a headboard body 12 and a cover plate 13 pivotally connected to the headboard body 12. The headboard body 12 comprises the receiving compartment 11 formed therein. Closing the cover plate 13 holds the side rail units (211, 221), the footboard 3, the bed slats 5, and the bed slat support 4 in the receiving compartment 11. Assisted with retention members (not shown), the cover plate 13 can be securely fixed in position. The retention members can be an engagement fitting, a sliding lock, or a Velcro device. Also, in the instant embodiment, the headboard body 12 is composed of three parts.

The coupler 6 is provided with a support stand 61, and in a condition of use, the support stand 61 is put in contact with the ground to improve the strength of the coupler 6 in use.

The coupler 6 comprises an upper connection bar 62 and a lower connection bar 63. The upper connection bar 62 and the lower connection bar 63 are arranged to be substantially parallel and connected, by means of screws, to the side rail units (211, 221) to form the side rail (21, 22). The lower connection bar 63 comprises the support stand 61 mounted thereto.

To increase the strength of the coupler 6, the coupler 6 can be structured to shown an I-shape, which is formed of the upper connection bar 62, the lower connection bar 63, and an intermediate connection bar (not shown) such that the upper connection bar 62 and the lower connection bar 63 are substantially parallel and an end of the intermediate connection bar is connected to the upper connection bar 62, while an opposite end connected to the lower connection bar 63, wherein the upper connection bar 62 and the lower connection bar 63 are fastened by screws to connect the side rail units (211, 221) to form the side rails (21, 22) and the lower connection bar 63 comprises the support stand 61 mounted thereto. The coupler 6 can be arranged to have different structures.

As shown in FIG. 4, the bed slat support 4 is composed of a first support member 41 that is mounted to the first side rail 21, a central support member 42 that has two ends respectively mounted to the headboard 1 and the footboard 3 in a detachable manner, and a second support member (not visible in the drawings) mounted to the second side rail 22. The first support member 41 can be composed of support units mounted to the side rail units 211 and the upper connection bar 62, meaning the upper connection bar 62 provides a function of the coupler 6 and also a function of the bed slat support 4; and similarly, the second support member can be composed of support units mounted to the side rail units 221 and the upper connection bar 62, meaning the upper connection bar 62 provides a function of the coupler 6 and also a function of the bed slat support 4; and the central support member 42 is composed of three support units.

The above description is made with reference to a preferred embodiment of the present invention and is not intended to constrain the present invention. Any equivalent variations that are made according to the essential ideas of the present invention are considered within the scope of protection of the present invention.

I claim:

1. A foldable bed, comprising: a headboard and additional components that include a first side rail, a second side rail, a footboard, and a bed slat support, the first side rail and the second side rail each having an end detachably connected to the headboard and an opposite end detachably connected to the footboard to form a frame, the bed slat support being arranged between the first side rail and the second side rail to support bed slats, wherein the headboard forms a receiving compartment therein and each side rail of the first side rail and the second side rail comprises at least two side rail units, which are coupled to each other by a coupler; wherein the first and second side rail units, the footboard, the bed slats, and the bed slat support are removable from the headboard and separable from each other and are receivable and positioned in the receiving compartment of the headboard;

wherein the headboard comprises a headboard body and a cover plate pivotally connected to the headboard body and rotatable with respect to the headboard body between a first position, where the cover plate is moved away from the headboard body to expose the receiving compartment for receiving the first and second rail units, the footboard, the bed slats, and the bed slat support into the receiving compartment, and a second position, where the cover plate closes the receiving compartment such that the cover plate holds the side rail units, the footboard, the bed slats, and the bed slat support in the receiving compartment;

wherein the headboard has opposite outside surfaces respectively defined by the cover plate and a flat panel of the headboard body and the outside surfaces of the headboard are flat surfaces with all the additional components received and held in the receiving compartment of the headboard.

2. The foldable bed according to claim 1, characterized in that the coupler comprises an upper connection bar and a lower connection bar, the upper connection bar and the lower connection bar being substantially parallel and being fastened by screws to connect the side rail units to form the side rails, the lower connection bar comprising a support stand mounted thereto.

3. The foldable bed according to claim 1, characterized in that the coupler comprises an I-shaped structure, which comprises an upper connection bar, a lower connection bar, and an intermediate connection bar, the upper connection bar and the lower connection bar being substantially parallel, the intermediate connection bar having an end connected to the upper connection bar and an opposite end connected to the lower connection bar, the upper connection bar and the lower connection bar being fastened by screws to connect the side rail units to form the side rails, the lower connection bar comprising a support stand mounted thereto.

4. The foldable bed according to claim 1, characterized in that the coupler comprises a support stand mounted thereto such that in a condition of use, the support stand is in contact with a ground surface.

5. The foldable bed according to claim 1, characterized in that the bed slat support comprises a first support member mounted to the first side rail, a central support member having two ends respectively connected to the headboard and the footboard in a detachable manner, and a second support member mounted to the second side rail.

* * * * *